Jan. 5, 1932.  K. LÖBBECKE  1,839,977
PROCESS AND APPARATUS FOR REGULATING FURNACES WORKING WITH DIFFERENT FUELS
Filed Nov. 2, 1928
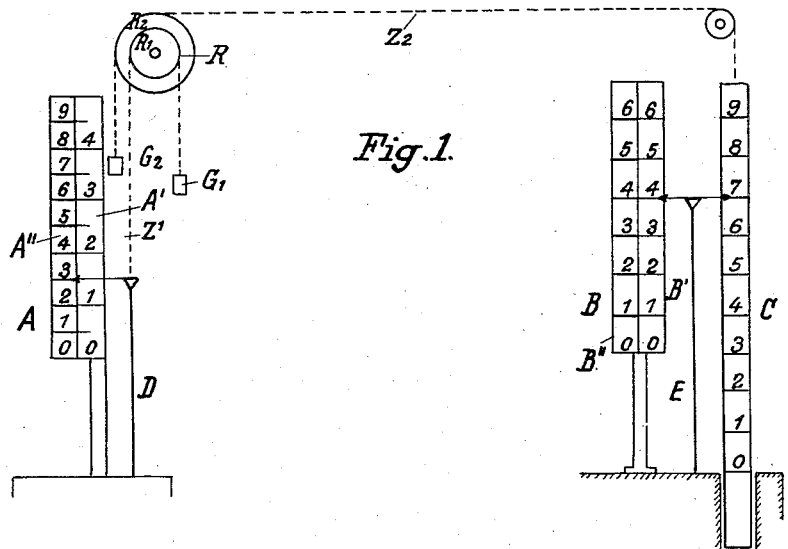
Fig.1.
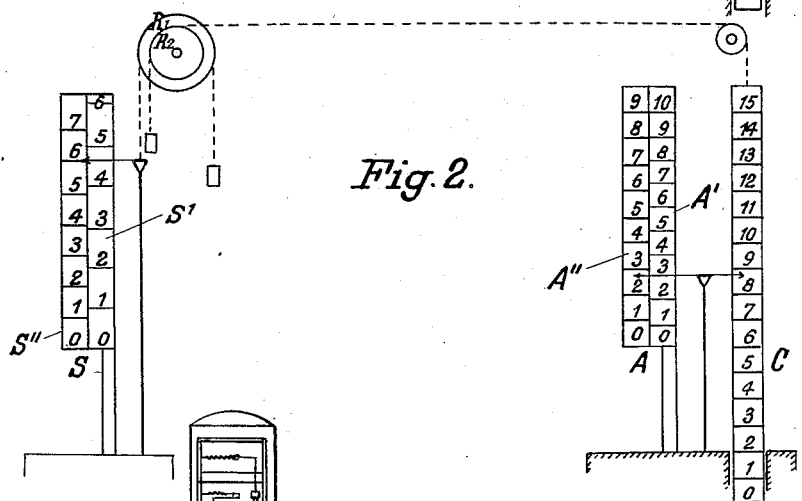
Fig.2.
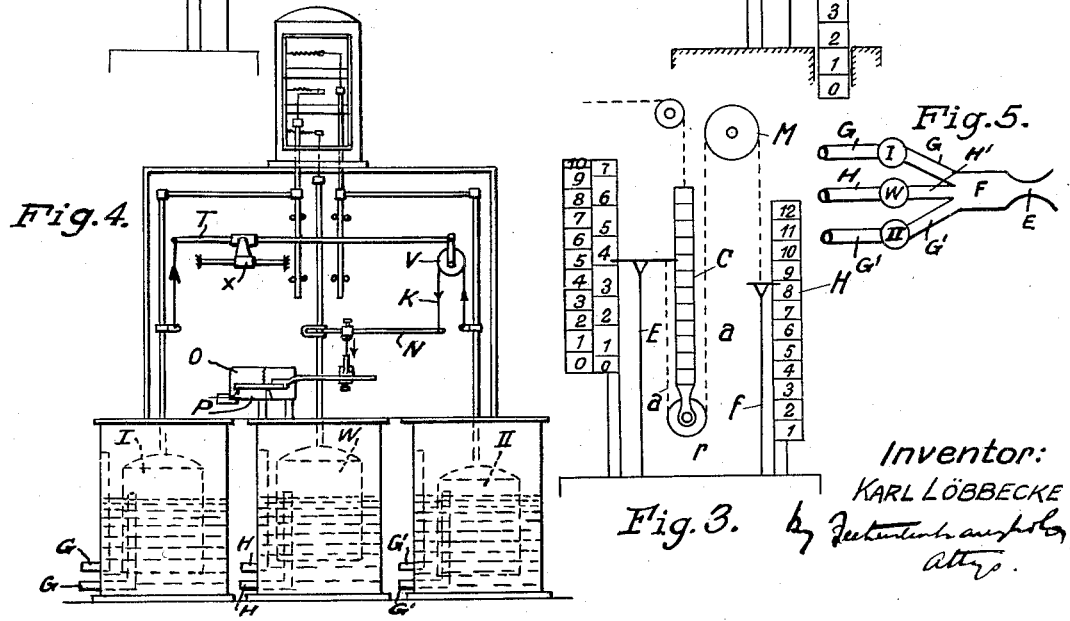
Fig.4.
Fig.3.
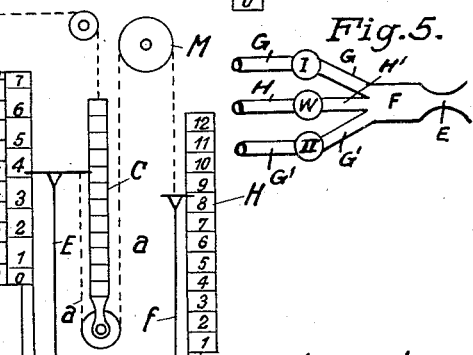
Fig.5.
Inventor:
KARL LÖBBECKE Patented Jan. 5, 1932

1,839,977

UNITED STATES PATENT OFFICE

KARL LÖBBECKE, OF RHEINHAUSEN, GERMANY

PROCESS AND APPARATUS FOR REGULATING FURNACES WORKING WITH DIFFERENT FUELS

Application filed November 2, 1928, Serial No. 316,853, and in Germany November 8, 1927.

The present invention relates to a process and apparatus for direct indication and regulation of the required combustion-air for furnaces worked with different fuels for instance with coke-gas and blast-furnace-gas. Regulation of such furnaces has hitherto offered certain difficulties in so far as proportioning of the total air-volume, under variation of the individual volumes of gases, has not at once been possible, and calculation has been the only way.

Instead of several gases, one gas and the one liquid fuel, such as oil, may be employed. It is likewise possible, to employ, instead of two different gases, one gas and one solid fuel, being for instance conveyed to the furnace by means of a sliding grate. For the sake of simplicity and better understanding, two gases will hereafter only be referred to. Protection is however obviously claimed to all furnaces, in which two fuels are burned together.

In mechanical adjustment it has been a practice to provide as many blast-pipes as kinds of gases are employed, whereby each branch of the blast-piping has been throttled by a separate regulator, controlled by the volume-meter of the respective gas-piping.

Just as many blast-pipes and regulators were consequently required, as kinds of gases employed. The only other way left, has been calculation and operating by hand.

The present invention enables a perfectly automatic calculation and adjustment of the throttling-device for the total air-volume supplied by one individual blast-pipe under any desired separate adjustment of the different gases, i. e. regulation of the air by means of one single regulator in accordance with the total quantity of air required.

The arrangement corresponds for instance to the consideration, that the total heat-volume, resulting from volume times calorific effect of the gas A, ($V_a.H_a$) plus volume times calorific effect of the gas B, ($V_b.H_b$), is equal to the total volume times total calorific effect:

(I) $Vs.Hs = Va.Ha + Vb.Hb$

By further development of this formula results, that after addition and subtraction of the value Va.Hb on the right hand side of the formula I. $W = V_a.H_a + V_b.H_b + V_a.H_b - V_a.H_b$
$= V_a(H_a - H_b) + (V_a + V_b).H_b$
$V_a + V_b = V_s,$ (II) $W = V_a(H_a - H_b) + V_s.H_b$ (for the case $H_a H_b$). The same process and the same device can be employed for the regulation of the total air-volume for two gases, etc. of which only the volume of one individual gas and the total volume of both gases are measured simultaneously.

In the accompanying drawings,

Fig. 1 illustrates an example of the scheme of the fundamental principle for indicating the total calorific effect, or the required total combustion air by measuring the single gas-volumes.

Fig. 2 illustrates a mode of embodying the invention in which the total gas volumes and one single gas are measured.

Fig. 3 illustrates a modified form with a movement of only one part of the indicating-device, the zero-mark being fixed to allow the mechanical regulation of the total blast.

Fig. 4 shows such an apparatus.

Fig. 5 is a diagrammatic showing of the arrangement.

In Figure 5, E is a burner to which the air-gas mixture is brought through pipe F. The gas consists of the mixture of two different gases which are brought into the pipe F through the tubes G, G and $G^1$, $G^1$, respectively. The air pipe is designated by H, $H^1$. The gas admitted through pipe G is measured by means of gas meter I, the gas admitted through the tube $G^1$ is measured by means of gas-meter II. The air in the air pipe H, $H^1$ is controlled by a valve not shown and metered by a meter W. The adjustment of the valve is according to the present invention automatic and in response to the amounts of gas which are measured by meters I and II, under consideration of the individual heating values which are characteristic of the individual gases. Instead of measuring the individual gases in the tubes G, $G^1$ and to add the multiplication with the heat contents, it is also possible that one measure the gas mixture in tube F and also one individual gas in G or G¹ and to subtract the meter values from each other after their multiplication with the respective heating values. The manner in which the control of the valve is carried out responsive to the measuring in I and II and under consideration of the heating values is as follows:

In Fig. 1, a tension-element Z1 is fastened to the hand D, indicating on the scale A the volume $A^1$, as well as the corresponding calorific effect, or the blast-volume $A^{11}$ required for the first individual gas, said element running over the small roller R1 of the double roller R. The cord Z1 is tightened by any suitable means as for instance a small balanceweight G1. Over the second roller R2, firmly connected with the roller R1, another cord Z2 runs, being tensioned by a balance-weight G2 whereby the scale C for the total blast-volume is raised, or lowered. The elements $Z_1$ $Z_2$, R, C, constitute the totalizing element. The scale C moves adjacent to the indicating pointer E for the volume of the second individual gas, on the other side of which the scale B, with the volume-division $B^1$ and the calorific effect division $B^{11}$ for the second individual gas has been provided. The hand E indicates on the movable scale C the required total blast-volume. By means of the double roller R, the units of the calorific effect of A are transferred on the scale C at the ratio of the calorific effect $$Ha:Hb=R1:R2.$$

The scale C must therefore have the scale-divisions for the units of the calorific effect, or air-volume of the second individual gas.

At zero-position of both indicating pointers E and D, the hand E stands upon 0 of scales B and C. If the hand D rises now by a gas-volume $A^1$ of 1500 cubicmeters at a calorific effect of $A^{11}$ of for instance 3000 kilogram calories per cubicmeter=$3\times 10^6$ cal., corresponding to 3000 cubicmeter required combustion-air (each $1\times 10^6$ kilogram calories=1000 cubicmeter blast), scale C will drop by 3000 cubicmeter blast in longitudinal units of scale B, indicating therefore the blast required by the first individual gas. Upon connecting the second gas, the hand E rises on the scale B to for instance 4000 cubicmeter gas, corresponding for instance to 4000 cubicmeter required blast which can be read from scale B. This blast-volume is however simultaneously added on scale C to the already required blast-volume of the first individual gas, the hand E indicating consequently the required total blast-volume on scale C.

By means of a similar apparatus, the required blast-volume can be indicated, if the total gas-volume and one single volume are measured.

From the formula I:
$Vs.Hs=Va.Ha+Vb.Hb$, by addition and subtraction of the value $Va.Hb$ on the right hand side, $Vs.Hs=Va.Ha/Vb.Hb +$
$\phantom{Vs.Hs=}Va.Hb-Va.Hb;$
$Vs.Hs=Va(Ha-Hb) + (Va+Vb).Hb;$
$\phantom{Vs.Hs=Va(Ha-Hb)+}Va+Vb-Vs$
$Vs.Hs=Va(Ha-Hb) + Vs.Hb$ for the case $HaHb$.

If on scale S (Fig. 2), the total gas-volume $S^1$ is taken as individual gas B, the calories, or blast-volume in $S^{11}$ corresponding to these volumes in gas B have to be noted besides the respective total gas-volume. $A^1$ on scale A indicates the volume of the one single gas A and $A^{11}$ as calorific effect for each 1000 cubic meters per hour indicates the difference between the calorific effect of gas A and gas B.

Owing to this arrangement I find in accordance with the above formula the transmission-ratio of the two rollers; scale C has therefore to be standardized as difference of gas heating-effect A-gas heating-effect B, for instance at $H_a=2200$, $H_b=1300$, to $(2.2-1.3)$. $10^6=0.9$. $10^6$ calories per 1000 cubic meters gas A, the ratio of transmission being therefore: $S:A=1.3:0.9=R_1:R_2$. If scale C is designed as sliding resistance, an air-propeller can directly be mechanically adjusted according to the desired blast-volume.

By installing a tension-screw into the scale-cord, a constant superfluity of air, or lack of air can be obtained, giving an oxidizing or reducing flame.

The mechanical operation of the apparatus can be varied within wide limits. It is for instance possible according to Fig. 3 to render only one movement sufficient in transferring the scale-indications, if, in addition to the arrangement of Fig. 1, a tension-element is fastened to the hand E, running over the roller $r$ attached to the scale C. The fixed roller M operates then the hand $f$, indicating on the scale H the total blast-volume. The scale H is stationary. The movement of scale C caused by scale A has in this case to be a half of the normal movement as shown in Fig. 1.

While the scale H is stationary, the scale C has been arranged slidable, both indicate the total blast-volume. In case of more than 2 gases, an additional arrangement according to Fig. 3 is provided for each new gas.

In like manner it will be possible to ascertain the volume and calorific value of one gas and effect thereupon the adjustment of the air-valve.

Numerous modes of embodying the fundamental principles of the invention are possible. Transfer of the ratio of transmission can for instance be effected by double-armed levers instead of rollers, whereby the lever-arms correspond to the ratio of transmission. Other mechanical and kinematic possibilities are likewise possible and conceivable.

By installing a tightening-up screw into the sheave-cord, a constant air surplus, or lack of air can mostly be produced for the purpose of a reducing, or oxidizing flame.

A device, according to this process, has been illustrated in Figure 4.

The two-gas regulator consists of a volume-meter with differential bell for the gas I, gas II and the blast. The movements of the bell of the gas-meter, corresponding to the volume of the passing gas, are, by means of a lever T transmitted upon a loose roller V (totalizing-element) attached to the other end of the lever. This lever T is provided with an adjustment-device X for the ratio of the calories between gas I and gas II. The motion is transmitted from the loose roller by means of a chain K and an intermediate lever N upon the lever of the regulator O, (which has only been indicated schematic), operating during its down-stroke an adjustment-motor P and opening the air-valve, but acting, during its upward stroke like an air-throttle. The air-valve is contained in the casing W and not specially illustrated.

If the gas-volume I rises, the bell ascends and the roller V descends and starts the adjustment-motor P by means of the lever N and the weight whereby the opening of the air throttle-valve is increased and the air-volume correspondingly. Some such device as a Venturi tube would, of course, have to be used in the gas and air supply lines and connected to gas and air inlets G, G; G¹, G¹ and H, H, to give the necessary differential pressure to operate the bells upon an increase or decrease of gas or air volume.

The bell of the air-volume-meter is hereby raised and lifts the fulcrum of the lever M so far, until the relay reaches its central position.

An increase in the air-volume takes likewise place under increasing gas-volume II. As the motions of the intermediate lever M are, according to the adjusted ratio in calories of the two gases I and II, differing in strength, the four-fold air-volume will be adjusted by the regulator under a certain increase in the gas-volume I, as under a like increase in the volume of the gas II.

The regulator totalizes therefore the gas-volumes automatically under simultaneous consideration of calorific values and regulates the respectively required blast-volume.

The arrows in Fig. 4 indicate the moving direction for increasing volumes. Above the regulating-apparatus, a registering-apparatus has been provided.

Transfer, corresponding to the calorific effect of the two kinds of gases and other transmission can also be effected electrically, instead of mechanically. The former has the advantage, that the ratio of transmission can be changed particularly easily, according to the respective change in calorific effect of the individual gases, so that the ratio of transmission can be made variable as a function of the calorific effect of the individual gases.

I claim:

1. A method of controlling the total amount of air necessary for burning a plurality of different fuels having different heating valves which are variable both with respect to their amounts supplied per time unit and to their heating value, by quantitatively measuring each individual gas, multiplying the measured quantities of each individual gas by its individual heating value, totalling these products and adjusting the amount of combustion air in proportion to the total of all products of gas amounts and their respective heating values.

2. In a flow system consisting of a plurality of supply lines for different fluids to a common chamber, a quantity meter in each supply line, means for multiplying the value of each quantity meter with a value characteristic to the particular fluid passing therethrough, means for adding up the so obtained products, another supply line for another different fluid, a control device in said other supply line, means for operating said control device in response to said means for adding up the multiplication results.

3. In a control apparatus for controlling the total amount of air necessary for burning in a furnace, a plurality of different fuels, which are variable both with respect to their amounts supplied per time unit and to their heating value, a conduit for each individual fuel, a conduit for the combustion air, quantity meters in each fuel conduit, means for multiplying the values of said quantity meters with the heating values of the fuel measured by the meter, means for adding up the results of this multiplication of all individual fuels, a control device in said air supply conduit, and means for operating said control device in response to said means for adding up the multiplication products.

4. In a control apparatus for controlling the total amount of combustion air necessary to burn a plurality of different fuels, conduits for the individual fuels, a quantity meter in each fuel conduit, said quantity meters cooperatively actuating devices to total up all individual fuels, and control means for maintaining the quantity of the combustion air in proportion to the total quantity of all fuels, said control means being actuated by said cooperatively actuated totalling devices.

5. In a control apparatus for controlling the total amount of combustion air necessary to burn a plurality of different fuels, conduits for the individual fuels, a quantity meter in each fuel conduit, indicators for indicating the amount of fuel, said quantity meters operating said indicators, said indicators cooperating to total up all individual fuels, and control means actuated by said cooperating indicators to maintain the quantity of the combustion air in proportion to the total quantity of all fuels.

6. In a control apparatus for controlling the total amount of combustion air necessary to burn a plurality of different fuels, conduits for the individual fuels, a quantity meter in each fuel conduit, a multiplying device for multiplying the amount of fuel indicated by the quantity meter by its heating value, a device to total up the heating value of all individual fuels, said multiplying device cooperatively actuating a device to total up the heating value of all individual fuels, and control means for the combustion air, said control means being actuated by said totalling device to maintain the combustion air in proportion to the total heating value of all fuels.

In testimony whereof I have affixed my signature.

Dr. KARL LÖBBECKE.